(12) United States Patent
Merkt (10) Patent No.: US 8,794,342 B1
(45) Date of Patent: Aug. 5, 2014

(54) TURF SEAMER

(71) Applicant: G2 Turftools, Inc., Athens, AL (US)

(72) Inventor: Eric Merkt, Athens, AL (US)

(73) Assignee: O2 Turftools, Inc., Athens, AL (US)

( * ) Notice: Subject to any disclaimer, the term of this patent is extended or adjusted under 35 U.S.C. 154(b) by 0 days.

(21) Appl. No.: 14/242,392

(22) Filed: Apr. 1, 2014

(51) Int. Cl.
*A01B 45/00* (2006.01)
*A01G 1/00* (2006.01)
*A01B 45/04* (2006.01)

(52) U.S. Cl.
CPC .................................... *A01B 45/04* (2013.01)
USPC .............................................. 172/1; 242/557

(58) Field of Classification Search
USPC ......... 172/1, 19, 20, 21, 26, 33, 40, 101, 253, 172/776, 681, 245–247; 242/559.3, 564.4, 242/594.2, 564.3, 557, 422.5; 414/24.6, 414/789.7, 791.6
See application file for complete search history.

(56) References Cited

U.S. PATENT DOCUMENTS

| | | | | |
|---|---|---|---|---|
| 2,681,517 A * | 6/1954 | Schmidt | ......................... | 37/352 |
| 3,644,954 A * | 2/1972 | LeGrand | ....................... | 15/50.3 |
| 3,982,711 A * | 9/1976 | Bradley et al. | ............. | 242/559.3 |
| 4,754,815 A * | 7/1988 | Brouwer et al. | .................. | 172/2 |
| 4,878,542 A * | 11/1989 | Brouwer et al. | .................. | 172/1 |
| 5,129,462 A * | 7/1992 | Mail | ............................. | 172/19 |
| 5,525,012 A * | 6/1996 | Casimaty et al. | ......... | 405/302.7 |
| 5,988,289 A * | 11/1999 | Holland et al. | ................. | 172/20 |
| 6,213,218 B1 * | 4/2001 | Miller | ............................. | 172/19 |
| 7,350,738 B1 * | 4/2008 | Himmelberg | .............. | 242/422.5 |
| 7,992,649 B2 * | 8/2011 | Merkt | ........................... | 172/197 |

* cited by examiner

*Primary Examiner* — Robert Pezzuto
(74) *Attorney, Agent, or Firm* — Joseph T. Guy; Perkins Law Firm, LLC (57) ABSTRACT

A turf seamer for seaming adjacent rows of turf is provided herein. The turf seamer has comprising a mounting frame with couplers for attachment to a transport vehicle for transport in a direction of travel. A conveyor carriage is attached to the mounting frame wherein the conveyor carriage comprises a front conveyor wheel and a rear conveyor wheel. A conveyor is on the conveyor carriage in a loop around the front conveyor wheel and the rear conveyor wheel. The conveyor has a multiplicity of conveyor base plates wherein each conveyor base plate is pivotally attached each adjacent conveyor base plate. Engagement pins extend from the conveyor base plates. The conveyor carriage also has a pivot for rotating the conveyor out of alignment of the direction of travel.

19 Claims, 9 Drawing Sheets

TURF SEAMER

BACKGROUND

The instant application is related to an improved device for bringing turf into tight engagement as to form a seam of turf. More importantly, the present invention is related to an improved device which can mechanically move laid turf towards previously laid turf to bring both into close arrangement as to form an invisible seam thereby providing the appearance and function of a continual turf surface.

There are many applications wherein an area is covered with turf, or sod, to form a grass surface. For the purposes of the present invention turf, or sod, is pre-grown, typically in a large area, and then cut therefrom as a long mat, of defined thickness and width, and rolled. The rolled turf is then transported to a prepared field and placed on the prepared field where it has the appearance, and function of a field grown from seed.

A field may be prepared by any method known in the art with particularly preferred devices, and methods, described in commonly assigned U.S. Pat. Nos. 7,992,649 and 8,555,992. The use of turf, or sod, to cover a prepared area is well known.

It is well known in the industry that turf can be very heavy and equipment to roll the turf out is well documented. Typically, a transport vehicle will traverse an area where the turf is to be placed and the sod unrolls as the transport vehicle moves forward. It is very difficult to place the turf in the proper location with a transport vehicle. If the turf is overlaid it is very difficult to move one layer off of the other without compromising the edge integrity of both layers. It is therefore a standard practice to lay the turf with a slight gap between the turf being laid and the adjacent layer and the laid turf is moved laterally, perpendicular to the direction of travel of the transport vehicle, towards the previously laid turf until the adjacent rows are in close proximity approximating a seamless surface. The method of laterally moving the turf typically involves a mini excavator or mechanical device attached to the side of a tractor or other vehicle wherein hydraulic cylinders with a plate push the sod together. This method often requires multiple pushes and often requires a temporary surface, such as plywood, and is therefore not a continuous operation. The sod laying operation is slowed due to the time required for seaming to be completed before initiating laying of another run. As the turf becomes thicker, such as 2 inch thick turf as used on professional playing surfaces, the task is even more difficult.

Provided herein is a mechanical device which can translate turf to form an invisible seam without damage to the turf.

SUMMARY

It is an object of the invention to provide a turf seamer capable of laterally translating a row of turf towards a previously laid row of turf without damage to either row of turf.

A particular feature of the invention is the savings realized by minimizing manpower requirements and speed with which turf can be applied to a given area.

These and other advantages, as will be realized, are provided in a turf seamer. The turf seamer has comprising a mounting frame with couplers for attachment to a transport vehicle for transport in a direction of travel. A conveyor carriage is attached to the mounting frame wherein the conveyor carriage comprises a front conveyor wheel and a rear conveyor wheel. A conveyor is on the conveyor carriage in a loop around the front conveyor wheel and the rear conveyor wheel. The conveyor has a multiplicity of conveyor base plates wherein each conveyor base plate is pivotally attached each adjacent conveyor base plate. Engagement pins extend from said conveyor base plates. The conveyor carriage also has a pivot for rotating the conveyor out of alignment of the direction of travel.

Yet another embodiment is provided in a system for laying turf on an area. The system includes a turf layer with a first transport vehicle, a turf supply and a method of placing turf from the turf supply in a linear path adjacent previously placed turf. A turf seamer is provided which is capable of engaging the in-process turf and translating the in-process turf into engagement with the previously placed turf. The turf seamer includes a mounting frame with couplers for attachment to a second transport vehicle for transport in a direction of travel. A conveyor carriage is attached to the mounting frame wherein the conveyor carriage comprises a front conveyor wheel and a rear conveyor wheel. A conveyor is on the conveyor carriage and forms a loop around the front conveyor wheel and the rear conveyor wheel. The conveyor has a multiplicity of conveyor base plates wherein each conveyor base plate is pivotally attached to each adjacent conveyor base plate. Engagement pins extend from the conveyor base plates. The conveyor carriage comprises a pivot for rotating the conveyor out of alignment with the direction of travel.

Yet another embodiment is provided in a method for seaming turf. The method includes:

applying a first row of turf;

applying a second row of turf parallel to the first row of turf with a separation distance between the first row of turf and the second row of turf; and engaging the second row of turf with a turf seamer coupled to a transport vehicle;

moving the turf seamer in a direction of travel wherein the turf seamer reduces the separation distance. The turf seamer comprises a conveyor carriage wherein the conveyor carriage comprises a front conveyor wheel and a rear conveyor wheel. A conveyor is on the conveyor carriage in a loop around the front conveyor wheel and the rear conveyor wheel. The conveyor has a multiplicity of conveyor base plates wherein each conveyor base plate is pivotally attached each adjacent conveyor base plate. Engagement pins extend from the conveyor base plates wherein the engagement pins reversible engage the second row of turf as said turf seamer moves along the direction of travel. The conveyor carriage further comprises a pivot for rotating the conveyor out of alignment with the direction of travel. The engagement pin at least partially disengages the second turf prior to the conveyor forming an arc around the rear conveyor wheel.

DESCRIPTION

The present invention is directed to a turf seamer for laterally shifting turf to form an invisible seam with previously laid turf adjacent thereto. More particularly, the present invention is related to a turf seamer capable of laterally shifting turf into tight engagement with adjacent turf without damage to the previously laid turf or the turf being translated thereby achieving a visually invisible seam with the appearance and feel of a continuous grass surface.

The invention will be described with reference to the figures forming an integral, non-limiting, component of the disclosure. The figures are intended to facilitate an understanding of the invention and are not intended to limit the invention in any way. Throughout the figures various elements will be numbered accordingly.

Throughout the description the terms "sod", "turf" or variations thereof refer to live grass provided in a form to be spread over a large area such as in rolls or the like.

Figure 1:
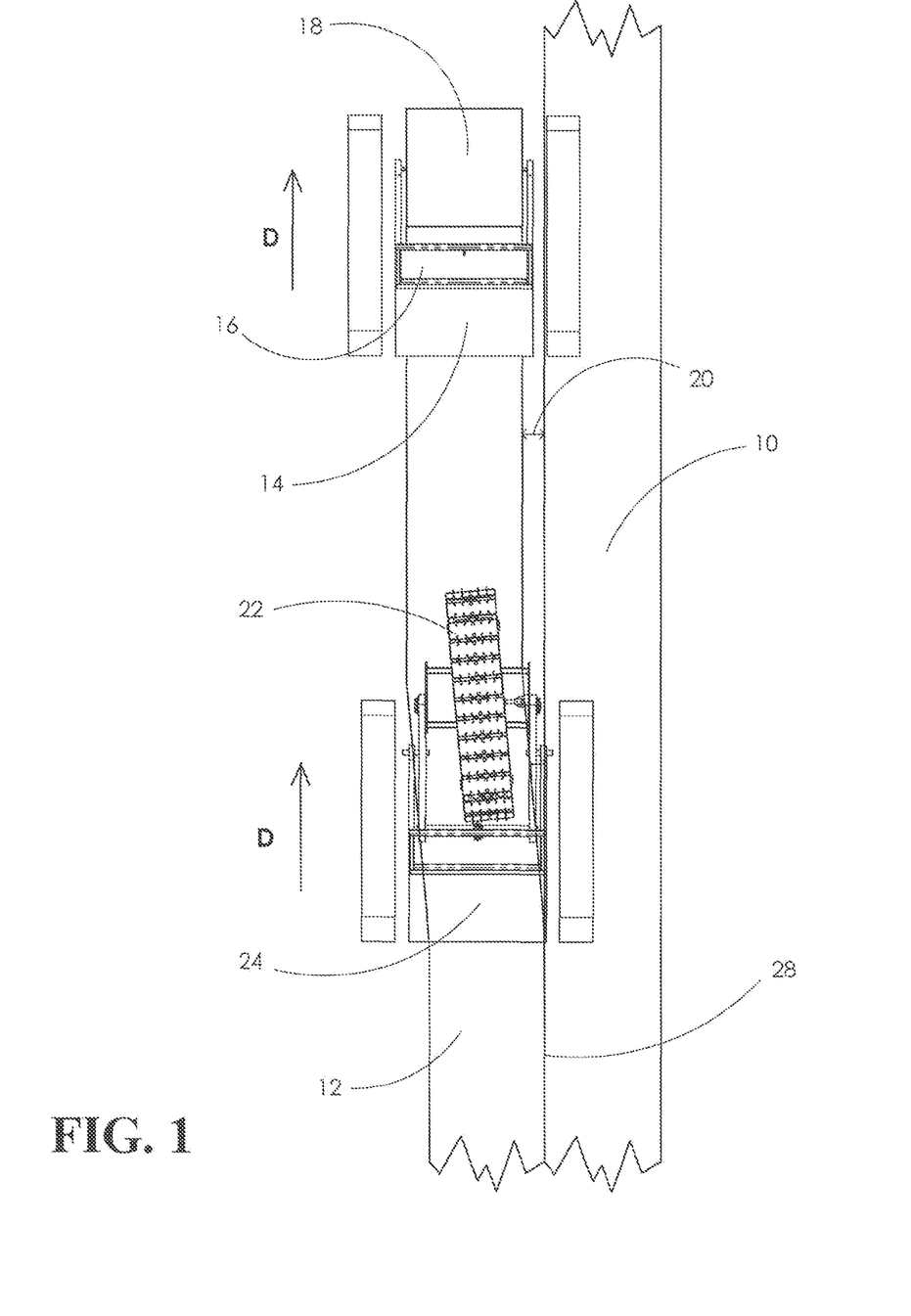
FIG. 1 is a schematic representation of an embodiment of the invention.

An embodiment of the invention will be described with reference to FIG. 1 wherein the invention is illustrated schematically in top view. In FIG. 1, a previously laid row of turf, referred to herein as placed turf, 10, for convenience is already in position and correctly located. An adjacent row, referred to herein as an in-process turf, 12, is illustrated as in the process of being laid. A first transport vehicle, 14, moves parallel to the placed turf as indicated by the arrow D. As the first transport vehicle moves forward in-process turf is fed from a turf layer, 16, from a turf supply, 18, such as a roll of turf. The turf layer is preferably either integral to, attached to, or towed behind the first transport vehicle as known in the art. The in-process turf is a separation distance, 20, from the placed turf. The separation distance is preferably small and most preferably the in-process turf does not overlay the placed turf. It is preferably that the separation distance be no more than 6 inches. The separation distance can be larger than 6 inches, however, multiple passes may be required which is undesirable from an efficiency perspective and increases the potential damage to the turf. In a particularly preferred embodiment the separation distance is above zero since moving in-process turf laterally forms a better seam than laying the turf with a zero separation distance. In other words, it is preferable to purposely lay the in-process turf with a separation distance followed by translating the turf to form the tight seam than to attempt to form a tight seam with the turf layer.

With continued reference to FIG. 1, the turf seamer, 22, preferably towed by a second transport vehicle, 24, by a hitch, 26, translates the in-process turf towards the placed turf thereby forming a tight seam, 28, with no separation distance. As would be realized the translation can be to the right, as illustrated, or to the left. With thick sod, such as 2 inch thick layers, the in-process turf can be pushed into the placed turf with considerable force without damage to either layer and in fact the force provided by a mechanical device has now been realized to be preferable over the limit of force provided by hand working the turf. An advantage, as will be realized, is the ability to adjust the force.

The turf layer and turf seamer may occur independently with separate transport vehicles or a turf layer and turf seamer may be coupled together for use with a common transport vehicle in a single pass wherein the turf is layed and seamed in a single pass. In one embodiment the turf seamer may be integrated into a commonly propelled unit which functions to lay turf and seam turf in one integrated unit.

Figure 2:
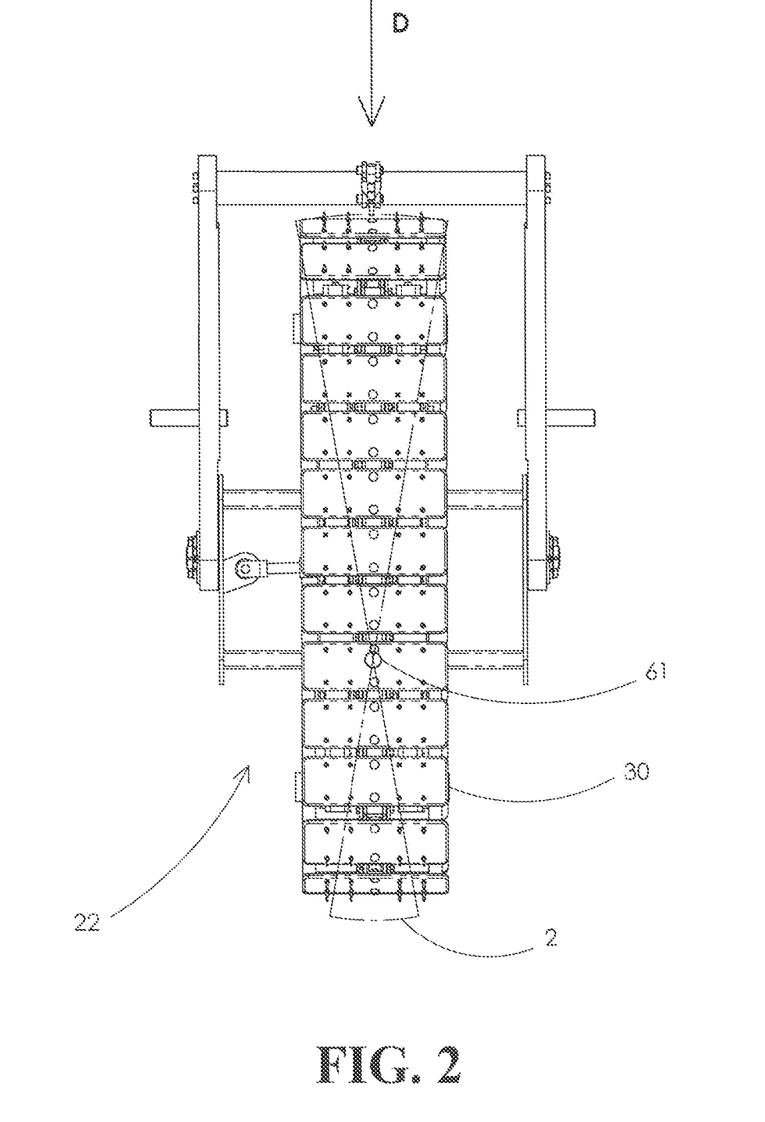
FIG. 2 is a schematic top view of an embodiment of the invention.

The turf seamer is illustrated in schematic overhead view in FIG. 2 with further description to follow. The turf seamer, 22, travels in a path indicated by D, with a conveyor, 30, at an angle relative to a pivot point, 61, as defined by a pivot arc, 2. As the turf seamer moves forward the conveyor engages turf thereunder. If the conveyor is rotated counter-clockwise, as viewed in FIG. 2, the turf will translate from left to right. If the conveyor is rotated clock-wise, as viewed in FIG. 2, the turf will translate from right to left. The larger the arc, or angle relative to D, the further the translation. The conveyor pivots relative to the pivot point, such that the conveyor is not aligned with the direction of travel, D. As the turf seamer moves forward the conveyor turns in concert with the forward movement wherein the in-process turf is grasped by the engagement pins towards the front of the turf seamer and persuaded laterally parallel to the conveyor thereby moving the turf laterally.

Figure 3:
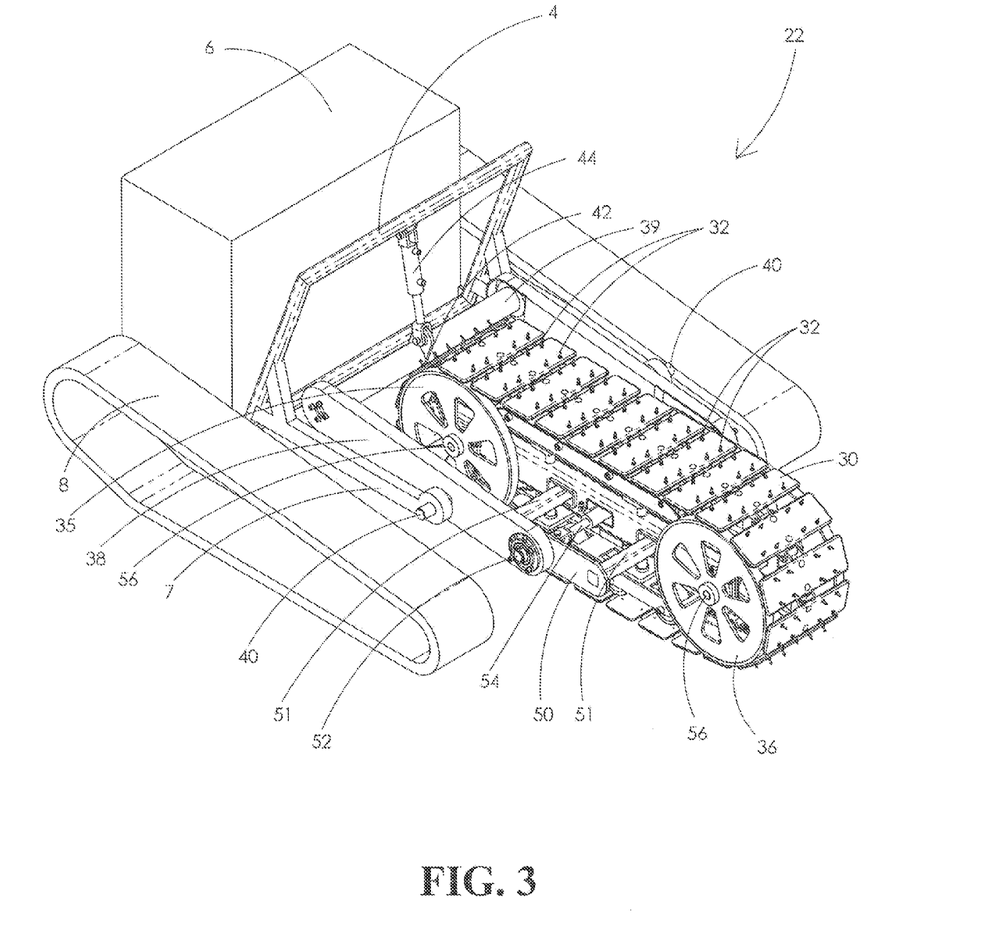
FIG. 3 is a schematic top perspective view of an embodiment of the invention.

An embodiment of the invention is illustrated in FIG. 3. In FIG. 3, a turf seamer, 22, is illustrated in top perspective schematic view attached to a turf layer, 6, and common transport machine schematically illustrated as tracks, 8. The turf seamer is preferably mounted to a transport vehicle by a lift arm support, 4, on the transport vehicle wherein the hitch includes lift arms, 7, and a hydraulic counter balance cylinder, 44.

Figure 4:
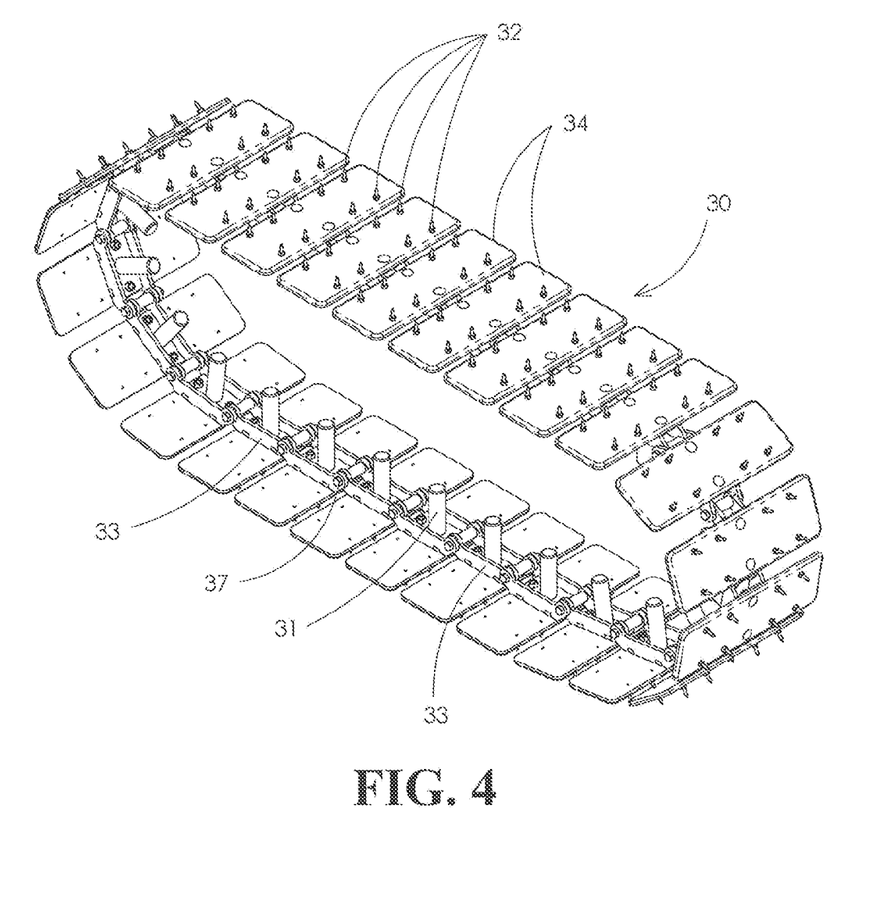
FIG. 4 is a perspective view of an embodiment of a conveyor of the instant invention in isolation.
Figure 5:
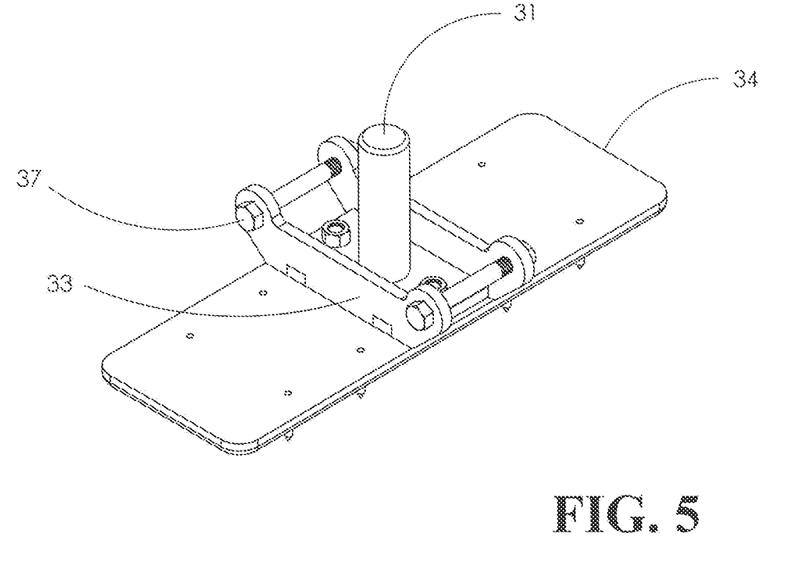
FIG. 5 is a perspective view of an embodiment of a conveyor base plate of the instant invention in isolation.
Figure 6:
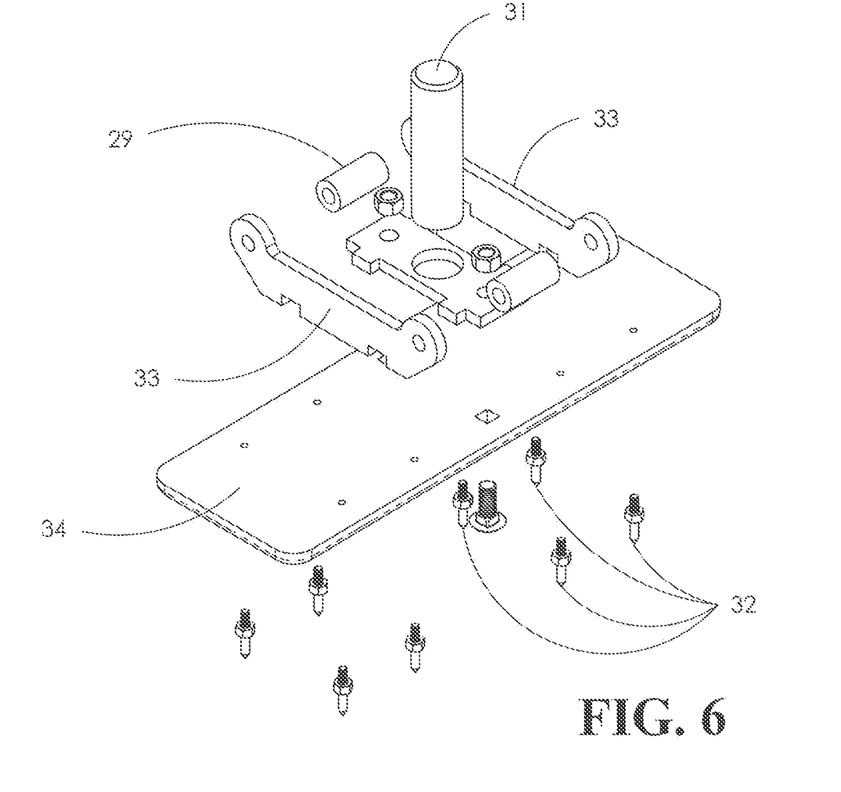
FIG. 6 is a perspective exploded view of an embodiment of a conveyor base plate of the instant invention in isolation.

The turf planer comprises a conveyor, 30, comprising linked conveyor base plates, 34, with engagement pins, 32, extending from the conveyor base plate. The conveyor, 30, will be described with reference to FIG. 4 wherein the conveyor is shown in perspective isolated view. The conveyor base plate is illustrated in FIG. 5 in isolated perspective view and in FIG. 6 in exploded perspective view. Each conveyor base plate is attached to a conveyor hinge, 33, which allows each conveyor base plate to pivot at a hinge pin, 37, and associated hinge bushing, 29, and a conveyor alignment pin, 31, extending inward. The engagement pins are preferably in groups on a common conveyor base plate, 34, with each conveyor base plate having at least one, and preferably a multiplicity, of engagement pins extending outward therefrom. The number of engagement pins is not particularly limited and is based on the overall size of the turf seamer and size of the turf being translated. The engagement pins are preferably detachable with a particularly preferred mounting method including mated threaded members with the threaded male element of the engagement pins engaged with a threaded female element of the conveyor base plate. Detachable pins are preferred since this allows damaged pins to be replaced and provides flexibility since different sized pins can be used for different applications. Pins which are integral, such as those welded to the conveyor base plate or engagement pins molded with or machined on the conveyor base plate, can be used with the understanding that they are more difficult to replace and flexibility is compromised. Each engagement pin is preferably shorter than the thickness of the turf being seamed yet sufficiently long to engage the turf sufficient for translation thereof without tearing or damaging the turf. An engagement pin of about 1-3 inches in length, as measured from the exterior face of the conveyor base plate is suitable for demonstration of the invention, based on 2 inch thick turf, with an engagement pin length of about 1 to about 1½ inches being particularly suitable with about 1.2 inches being optimum for 2 inch turf. As the size of the turf is adjusted the length of the engagement pin may be adjusted as would be easily determined by one of skill in the art based on the teachings herein.

Figure 7:
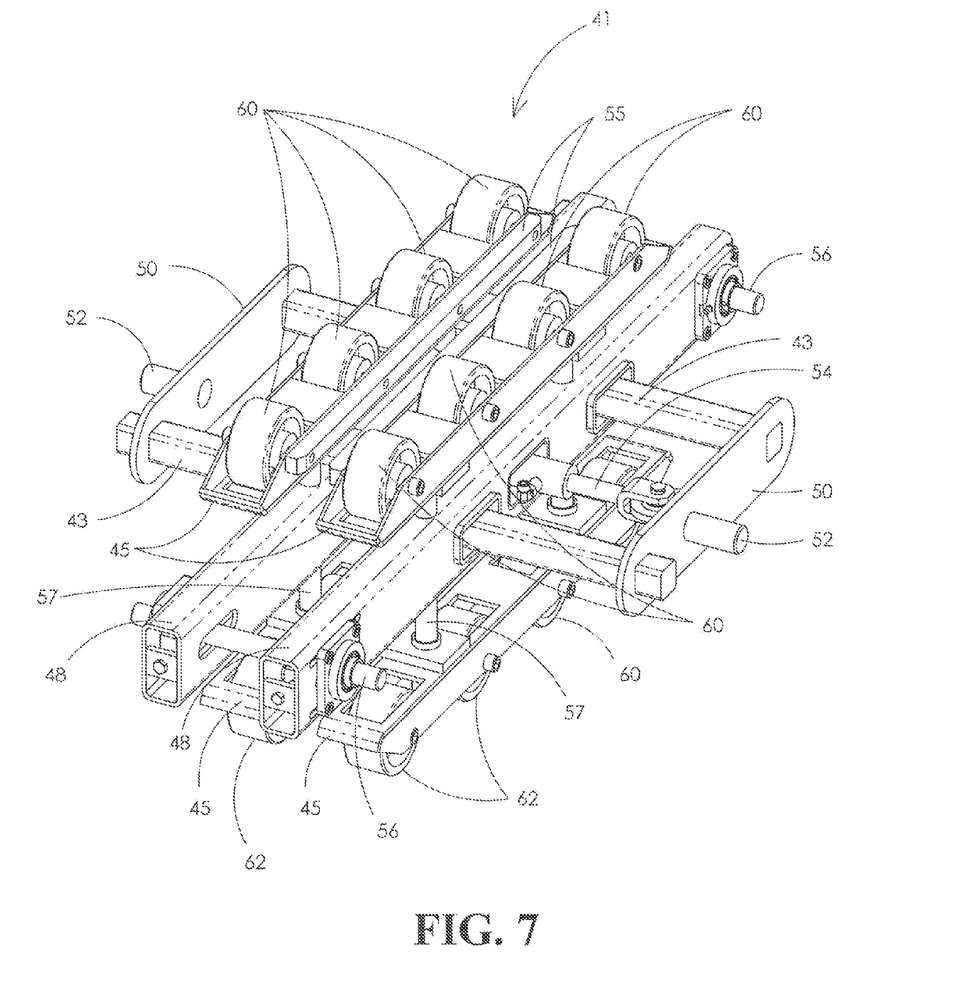
FIG. 7 is a perspective view of an embodiment of a conveyor carriage of the instant invention.
Figure 8:
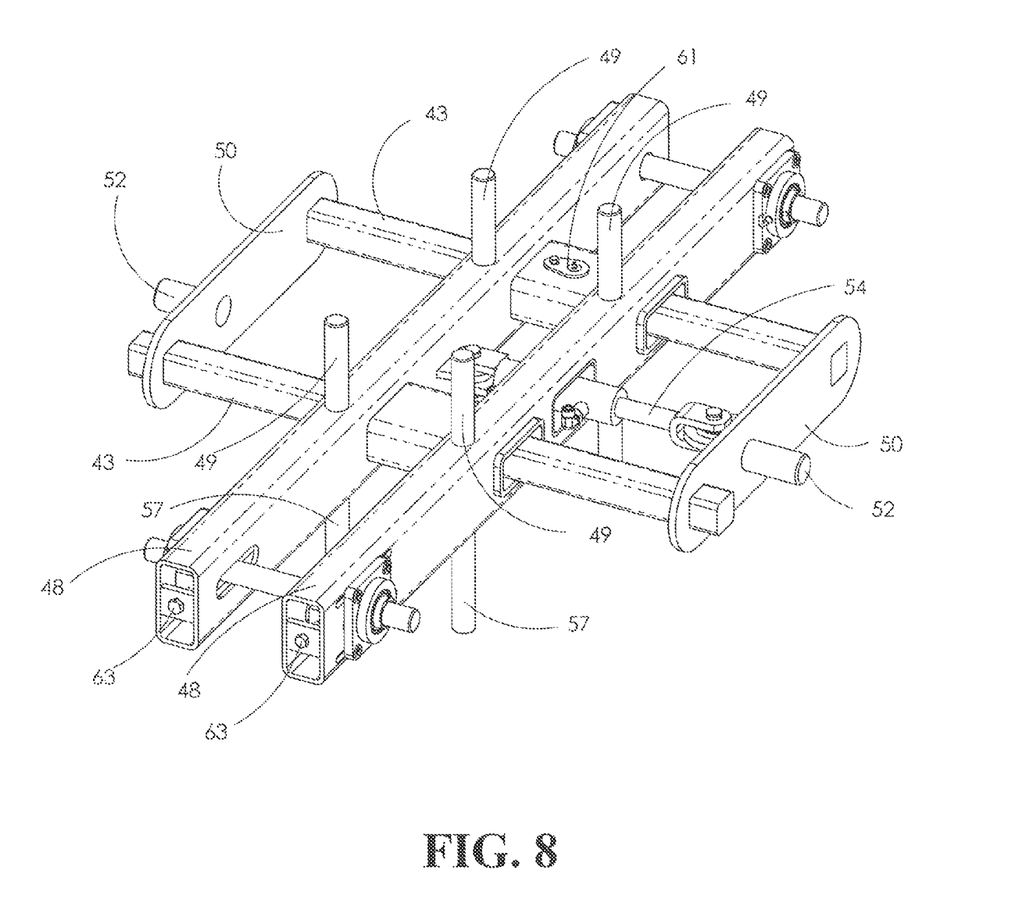
FIG. 8 is a perspective view of an embodiment of a conveyor carriage sub-assembly of the instant invention.

With reference back to FIG. 3, the conveyor forms a loop around rear and front conveyor rollers, 35 and 36, respectively. The front and rear conveyor rollers are mounted on a conveyor carriage. A perspective isolated view of the conveyor carriage, 41, is provided in FIG. 7 with the front and rear conveyor roller removed for clarity. A sub-assembly of the conveyor carriage is illustrated in FIG. 8 with various components removed for the purpose of visualization of components otherwise visually obscured and for a better understanding of the operation.

The conveyor carriage comprises frame supports, 48, with passages for slidably receiving pivot shafts, 43. Track alignment and tension adjustors, 63, are arranged, preferably, in the frame supports. The pivot shafts, 43, are attached to frame side plates, 50. As would be realized the frame supports translate along the pivot shafts in response to a hydraulic pivot cylinder, 54, mounted there between thereby allowing the conveyor to pivot on a pivot point, 61, which alters the angle of the conveyor relative to the direction of travel as discussed elsewhere herein. The hydraulic pivot cylinder may further comprise a counter balance circuit to control the pressure, or force, generated against the previously laid sod thereby providing automatic control of the seaming process. Roller frames, 45, are mounted to the frame supports, preferably by upper conveyor roller support rods, 49, which are preferably adjustable in length to allow for adjustment of conveyor tension. Upper idler rollers, 60, are rotationally attached to the roller frames, 45, such as on axles, and the conveyor base plates of the conveyor roll on the upper idler rollers. Track guide strips, 55, receive there between the conveyor alignment pins, 31, of the conveyor base plate to assist in maintaining the conveyor in a parallel arrangement with the conveyor carriage and to avoid lateral movement of the conveyor relative to the conveyor carriage. The conveyor rollers, 35 and 36, are mounted on axles, 56, with appropriate bearings which are understood to be preferred but which are not specifically called out. Lower roller bases, 53, are mounted below the frame supports, preferably by lower roller base support rods, 57. Lower idler rollers, 62, are rotationally attached to the lower roller base, 53, such as on axles, and the conveyor base plates of the conveyor roll on the lower idler rollers. It is preferably that the distance between the lower roller bases and frame supports be adjustable thereby allowing for the adjustment of the conveyor tension and for adjustment of the conveyor track as will be more fully described herein. The adjustment may be by the use of adjustable lower roller base support rods or by other methods as known in the art.

Figure 9:
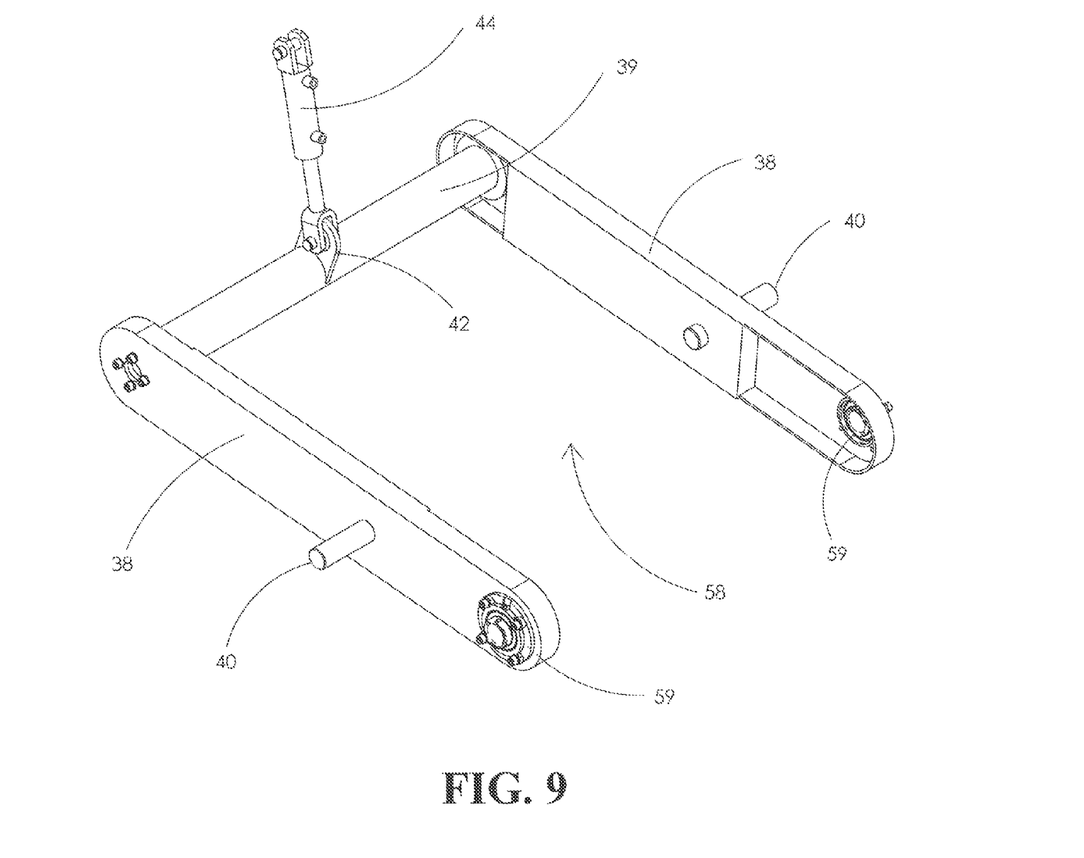
FIG. 9 is a perspective view of an embodiment of a mounting frame of the instant invention.

A mounting frame is illustrated in perspective isolated view in FIG. 9. The mounting frame comprises frame side mounts, 38, to which the conveyor carriage is pivotally mounted. The pivot pins of the carriage assembly are preferably received in bearings, 59, or similar structures in the frame side mounts. A cross-brace, 39, spans between the frame side mounts and provides a mounting location for the hydraulic counter balance cylinder, 44, at a counter balance cylinder mount, 42. The hydraulic counter balance cylinder preferably has an adjustable length and most preferably the length is adjustable by hydraulics. The mounting frame is attached to the second tow vehicle, such as a tractor. In a particularly preferred embodiment the primary frame comprises arm couples, 40, for attachment to lift arms of a hitch, and a counter balance cylinder mount, 42, for attachment to hydraulic counter balance cylinder, 44.

The contour of the top of the loop is not particularly limited herein as the purpose is simply to return the conveyor to an engaging position which is below the turf seamer. The contour of the loop of the conveyor is more specifically defined herein below.

Figure 10:
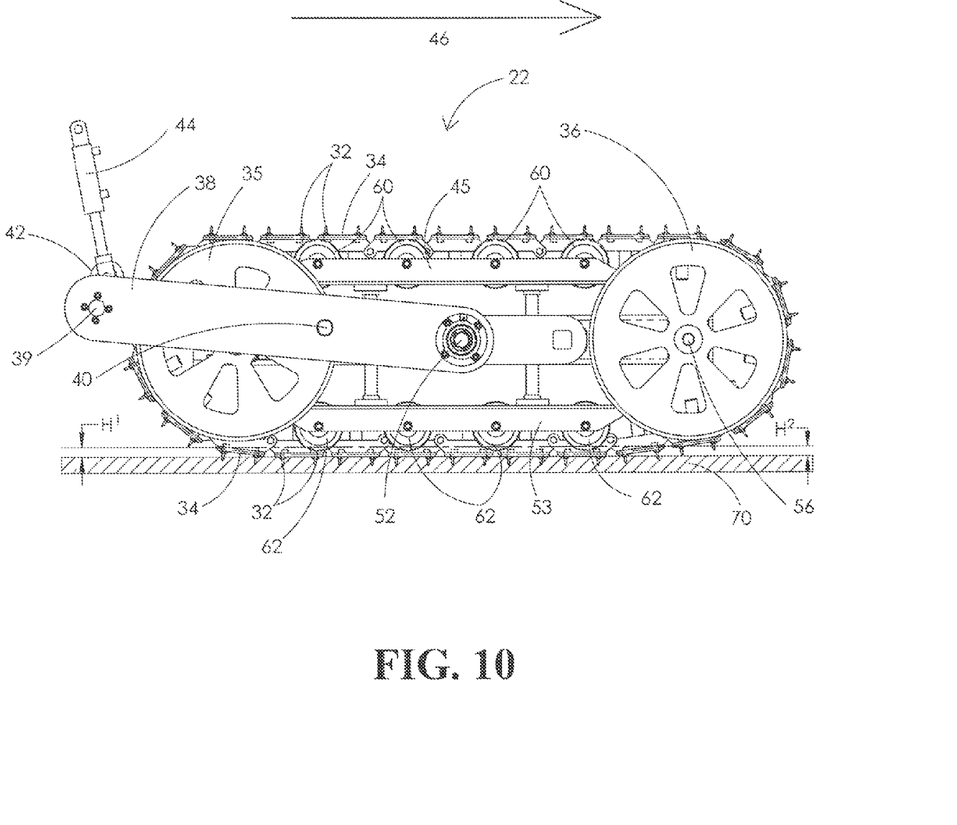
FIG. 10 is a side view of an embodiment of the instant invention.

An embodiment of the invention will be described in FIG. 10. In FIG. 10 the turf seamer is illustrated in side view. In FIG. 10, the path of the conveyor can be more readily visualized. The conveyor is supported by optional, but preferable, upper idler rollers, 60. The upper idler rollers support the conveyer as it spans the space between the front and rear conveyor rollers and may be adjustable, perpendicular to the conveyor, to provide a mechanism for adjusting the tension on the conveyor. Lower idler rollers, 62, are provided to support the conveyor in the gap between the front and rear conveyor rollers. The lower idler rollers preferably share a common lower tangent thereby allowing the conveyor to be approximately straight from the tangent of the forward-most lower idler roller, which corresponds approximately to the contact point between the conveyor and forward most idler roller, and the tangent of rear-most lower idler roller which also corresponds approximately to the contact point between the conveyor and the rear-most lower idler roller. The number of lower idler rollers between the forward most and rearward most is selected based on the weight of the turf seamer and the rigidity of the conveyor. The common lower tangent defined by the lower idler rollers, which is approximated by the conveyor, is below the lower common tangent of the front conveyor roller and rear conveyor roller. As the conveyor passes the rearward most lower idler roller it rises to meet the rear conveyor wheel which is raised from the surface by a distance $H^1$. The change in height, relative to the turf, 70, causes the conveyor base plate, 34, to rise approximately straight up thereby disengaging the engagement pin linearly from the turf prior to starting the arc around the rear conveyor wheel. By having the conveyor base plate, and associated engagement pin, rise approximately straight up from the turf any tearing of the turf is avoided. The elevation of the rear conveyor wheel above the turf, $H^1$, is preferably at least as high as the length of the engagement pins thereby insuring that the engagement pin is completely disengaged from the turf prior to initiating an arc as defined by the circumference of the rear conveyor wheel. Similarly, the front wheel is preferable elevated above the turf by a distance, $H^2$, which may be a same height than $H^1$, however, having $H^1$ and $H^2$ be the same height is preferred for simplicity of design. As the conveyor spans from the front wheel to the forward most lower idler the trajectory is approximately straight down thereby allowing the engagement pin to pierce the turf with little lateral movement which minimizes any tearing of the turf.

The weight of the turf seamer is not particularly limited since the effective weight can be increased or decreased relative to the actual weight by the hydraulic counter balance cylinder, 44. The weight applied must be sufficient for the engagement pins to pierce the turf and more weight than that increases the force required to slide the turf since extra weight will create increase friction at the interface of the turf and prepared surface. In practice a weight of about 20 to 25 pounds per square inch is suitable for demonstration of the teachings based on a conveyer length of about 40-45 inches long and 25-20 inches wide contacting approximately two inch thick turf. These parameters can be adjusted as the turf thickness changes and the conveyor size changes.

The material of construction is not particularly limited herein. Steel is particularly suitable due to cost considerations and the lack of significant weight constraints. Though not discussed, one of skill in the art would immediately realize that bearings, axles, gussets, braces, lubrication fittings and other engineering features typically employed in mechanical devices would be used throughout as necessary and desired. Various covers and shields may be desired for safety and aesthetics which may not alter the basic function but which may be necessary to comply with any local, regional or national safety standards or for branding considerations.

The invention has been described with particular reference to preferred embodiments without limit thereto. One of skill in the art would realize additional embodiments and improvements which are not specifically enumerated but which are within the scope of the invention as specifically set forth in the claims appended hereto.

The invention claimed is:

1. A system for laying turf on an area comprising:
   a turf layer comprising:
   a first transport vehicle;
   a turf supply; and
   a means of placing turf from said turf supply in a linear path of in-process turf adjacent previously placed turf; and
   a turf seamer capable of engaging said in-process turf and translating said in-process turf into engagement with said previously placed turf comprising:
   a mounting frame with couplers for attachment to a second transport vehicle for transport in a direction of travel;
   a conveyor carriage attached to said mounting frame wherein said conveyor carriage comprises a front conveyor wheel and a rear conveyor wheel;
   a conveyor on said conveyor carriage forms a loop around said front conveyor wheel and said rear conveyor wheel wherein said conveyor comprises:
   a multiplicity of conveyor base plates wherein each conveyor base plate of said conveyor base plates is pivotally attached each adjacent conveyor base plate; and
   engagement pins extending from said conveyor base plates; wherein
   said conveyor carriage further comprises a pivot for rotating said conveyor out of alignment with said direction of travel.

2. The system for laying turf on an area of claim 1 wherein said first transport vehicle and said second transport vehicle are a common vehicle.

3. The system for laying turf on an area of claim 1 wherein said conveyor carriage is pivotally attached to said mounting frame.

4. The system for laying turf on an area of claim 1 wherein said conveyor carriage comprises lower idler rollers.

5. The system for laying turf on an area of claim 4 wherein said conveyor travels on a common tangent of said lower idler rollers.

6. The system for laying turf on an area of claim 5 wherein said rear conveyor wheel at a point of contact closest to a closest lower idler roller is above said common tangent.

7. The system for laying turf on an area of claim 5 wherein said front conveyor wheel at a point of contact closest to a closest lower idler roller is above said common tangent.

8. The system for laying turf on an area of claim 5 wherein said conveyor travels above said common tangent prior to forming an arc on a circumference of said rear conveyor wheel.

9. The system for laying turf on an area of claim 1 wherein said conveyor carriage further comprises upper idler rollers.

10. The system for laying turf on an area of claim 1 where said couplers are attachable to a hitch.

11. A method for seaming turf comprising:
    applying a first row of turf;
    applying a second row of turf parallel to said first row of turf with a separation distance between said first row of turf and said second row of turf;
    engaging said second row of turf with a turf seamer coupled to a transport vehicle;
    moving said turf seamer in a direction of travel wherein said turf seamer reduces said separation distance;
    wherein said turf seamer comprises:
    a conveyor carriage wherein said conveyor carriage comprises a front conveyor wheel and a rear conveyor wheel;
    a conveyor on said conveyor carriage in a loop around said front conveyor wheel, said rear conveyor wheel wherein said conveyor comprises:
    a multiplicity of conveyor base plates wherein each conveyor base plate of said conveyor base plates is pivotally attached each adjacent conveyor base plate; and
    engagement pins extending from said conveyor base plates wherein said engagement pins reversible engage said second row of turf as said turf seamer moves along said direction of travel; wherein
    said conveyor carriage further comprises a pivot for rotating said conveyor out of alignment with said direction of travel; and
    wherein said engagement pin at least partially disengages said second turf prior to said conveyor forming an arc around said rear conveyor wheel.

12. The method for seaming turf of claim 11 wherein said conveyor carriage is pivotally attached to said mounting frame.

13. The method for seaming turf of claim 11 wherein said conveyor carriage comprises lower idler rollers.

14. The method for seaming turf of claim 13 wherein said conveyor travels on a common tangent of said lower idler rollers.

15. The method for seaming turf of claim 14 wherein said rear conveyor wheel at a point of contact closest to a closest lower idler roller is above said common tangent.

16. The method for seaming turf of claim 14 wherein said front conveyor wheel at a point of contact closest to a closest lower idler roller is above said common tangent.

17. The method for seaming turf of claim 14 wherein said conveyor travels above said common tangent prior to forming an arc on a circumference of said rear conveyor wheel.

18. The method for seaming turf of claim 11 wherein said conveyor carriage further comprises upper idler rollers.

19. The method for seaming turf of claim 11 where said couplers are attachable to a hitch.

* * * * *